United States Patent Office 3,338,978
Patented Aug. 29, 1967

3,338,978
METHOD OF PRODUCING DIFLUOROCARBENE RADICALS AND OF USING THE SAME
Earl Phillip Moore, Jr., Wilmington, Del., assignor to E. I. du Pont de Nemours and Company, Wilmington, Del., a corporation of Delaware
No Drawing. Filed Apr. 24, 1963, Ser. No. 275,233
The portion of the term of the patent subsequent to June 9, 1981, has been disclaimed
3 Claims. (Cl. 260—648)

This invention relates to a novel method for the production of difluorocarbene (—$CF_2$—) radicals and to products obtained by reaction of difluorocarbene radicals with themselves and with other molecules.

Fluorocarbon chemicals are becoming of increasing importance, and there is a great need to provide efficient syntheses in this field. In many instances, reactions analogous to reactions in the field of hydrocarbon chemistry are applicable to fluorinated compounds. The generally inert character of fluorocarbons, however, frequently make such reactions difficult to perform under reasonably mild conditions, and synthesis in this field is accordingly difficult. There also exists a relatively small body of chemistry which is peculiar to the field of fluorocarbons. Noteworthy in this class are reactions involving difluorocarbene.

Difluorocarbene has been postulated as an intermediate in many reactions. A noteworthy example is the pyrolysis of chlorohydrofluorocarbons, particularly chlorodifluoromethane. When chlorodifluoromethane is pyrolyzed, the reaction products comprise tetrafluoroethylene, hexafluoropropylene, octafluorocyclobutane, and products of the formula $H(CF_2)_nCl$ which may be accounted for by the formation and subsequent reaction of difluorocarbene. The minimum temperature needed to effect this pyrolysis, however, is in the neighborhood of 500° C., and preferably temperatures of 700 to 900° C., are employed. At these temperatures, few organic molecules are sufficiently stable to act as independent reactants, and hence the production of difluorocarbene by this reaction does not provide a widely applicable synthetic tool. Again, difluorocarbene has been postulated as an intermediate in some reactions at low temperatures, but the conditions have been such that the difluorocarbene was not available as a reactant for reacting with many organic compounds.

It has now been discovered that difluorocarbene can be produced efficiently at relatively low temperatures by the pyrolysis of 1-olefin epoxides, preferably tetrafluoroethylene epoxide and hexafluoropropylene epoxide. The latter epoxides are preferred by reason of their relative availability and since the pyrolytic degradation appears to occur at lower temperatures with these materials than with epoxides of the higher fluoro-1-olefins.

The temperature at which the pyrolytic decomposition takes place may be as low as 100° C., but higher temperatures in the range of 150 to 300° C. are preferred. Higher temperatures than 300° C. may be employed, but in many instances tend to promote undesirable side reactions.

Pressure is not critical, but in many instances it is preferable to operate at elevated pressures, generally in the range of 500 atmospheres to 2500 atmospheres.

It has also been found that the 1-olefin epoxides may be rearranged to perfluoromethyl ketones in the presence of Lewis acids, and particularly the stronger Lewis acids, and to acid fluorides by the action of Lewis bases. If such catalysts are present in the reaction medium, the isomerization reactions will compete with the pyrolytic decompositions. At the lower temperatures, the molecular rearrangement will prevail and little or no products attributable to difluorocarbene will be produced. However, at temperatures above 200° C., and preferably above 250° C., the reactions may compete. Thus hexafluoropropylene epoxide may be rearranged to hexafluoroacetone by passing the epoxide over gamma alumina, a Lewis acid, at temperatures of about 150° C. The yield is substantially quantitative. At temperatures above 250° C. difluorocarbene is simultaneously produced and substantial yields of perfluoroisobutylene epoxide may be obtained by addition of the difluorocarbene to the ketonic double bond. The reactions may be represented by the chemical equations

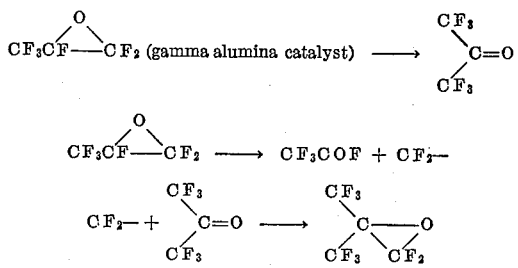

$$CF_3C\overset{O}{\overset{|}{F}}\text{---}CF_2 \longrightarrow CF_3COF + CF_2\text{---}$$

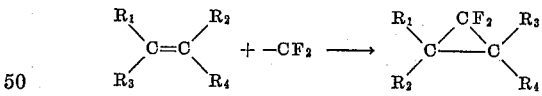

It will be realized that perfluoroisobutylene epoxide may be produced from hexafluoropropylene epoxide by a two-step process in which a part of the hexafluoropropylene epoxide is catalytically rearranged to hexafluoroacetone and then reacted with difluorocarbene produced by pyrolysis of the remaining hexafluoropropylene epoxide in the absence of catalysts.

In the light of these competing reactions, the presence of Lewis acids and bases should generally be avoided.

The difluorocarbene radicals produced by the pyrolytic reactions of this invention may be isolated per se by pyrolyzing the 1-olefin epoxide in the presence of one of the higher atomic weight rare gases (e.g., argon) and immediately freezing the mixture on a plate maintained at liquid helium temperature. Generally speaking, however, it is unnecessary and even undesirable to isolate the difluorocarbene radicals, the reaction with other compounds being accomplished by conducting the pyrolysis of the fluoroepoxide to difluorocarbene in their presence.

An exceptionally wide variety of olefinic compounds may be reacted with difluorocarbene radicals to produce a three-membered ring system containing a $CF_2$ group. The reaction may be represented by the equation $$\underset{R_3}{\overset{R_1}{\diagdown}}C=C\underset{R_4}{\overset{R_2}{\diagup}} + -CF_2 \longrightarrow \underset{R_3}{\overset{R_1}{\diagdown}}C\underset{R_2}{\overset{CF_2}{\diagdown}}\underset{R_4}{\overset{R_3}{\diagup}}C$$

in which $R_1$, $R_2$, $R_3$ and $R_4$ may be hydrogen, halogen (including fluorine), alkyl radicals including branched alkyl radicals usually having from 1 to 10 carbon atoms, alkoxy groups wherein the alkyl radical is a lower alkyl radical, halogenated alkyl radicals and alkoxy radicals, aryl radicals including phenyl and naphthyl radicals and nuclear substituted derivates thereof, heterocyclic radicals such as the pyridyl radical, aralkyl radicals wherein the aforesaid aryl radicals are separated from the double bond system by an alkylene moiety generally having from 1 to 10 carbon atoms. The radicals $R_1$, $R_2$, $R_3$ and $R_4$ may also be taken pairwise to represent biradicals, i.e., the olefinic group may be part of, or attached to, a cycloparaffin group, which in turn may be substituted by halogen, fused to other ring systems or the like.

It will further be obvious to those skilled in the art that more than one olefinic double bond may be present in the molecule, the plurality of double bonds being isolated, conjugated or in the allenic configuration.

In addition certain fluorinated and chlorinated ketones may also be reacted with the difluorocarbene radicals produced by the process of the instant invention, to yield fluorocarbon epoxides according to the reaction

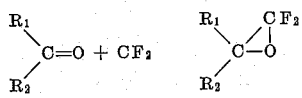

wherein $R_1$ and $R_2$ are alkyl radicals, generally having from 1 to 8 carbon atoms which are fully substituted with fluorine or chlorine at the carbon atoms adjacent to the ketonic carbon atom i.e. no alpha hydrogen atoms are present. The reaction is also applicable to cyclic ketones i.e. when $R_1$ and $R_2$ are taken pairwise to represent a biradical, generally having from 3 to 5 carbon atoms between the two radical ends, and having up to 10 carbon atoms.

Specific examples of compounds which form three membered rings by addition of the —$CF_2$ radical to a double bond are ethylene, propylene, butene-1, pentene-1, hexene-1, heptene-1, octene-1, decene-1, isobutene, cis-2-butene, trans-2-butene, 2-ethylhexene-1, isooctene, vinyl cyclohexane, tetramethylethylene, cyclopropene, cyclobutene, cyclopentene, cyclohexene, 1:3-butadiene, allene, vinyl acetylene, cyclopentadiene, alpha-vinyl napthalene, 1-ethyl-2-vinyl naphthalene, styrene, 4-methyl styrene, cyclopentadiene dimer, norbornene, chloroprene, isoprene, cyclooctatetraene, and the like, perfluoroethylene, perfluoropropylene, perfluorobutene-1, perfluoropentene-1, perfluorohexene-1, perfluoro-trans-2-butene, perfluoro-2-methyl-trans-butene-2, perfluorocyclobutene, perfluorocyclopentene, perfluorocyclohexene, perfluoromethylene cyclobutane, omega-hydroperfluoropentene-1, omega-hydroperfluoroheptene-1, omega-hydroperfluoroheptene-1, 1,1,1-trifluoro-4,4,4-trichloromethyl butene-2, chlorotrifluoroethylene and the like.

Representative of the ketonic compounds which may be reacted with difluorocarbene to yield fluorinated epoxy compounds are hexafluoroacetone, sym-dichlorotetrafluoroacetone, 1,1,1-trichloro-3,3,3-trifluoroacetone, perfluoro-2,3-dimethyl hexanone, 1-hydroperfluoro heptane-2-one, perfluorocyclohexanone, perfluorocyclopentanone, perfluorocyclobutanone, and like fluorinated cyclic ketones having perfluoroalkyl substituents, 2-chloroperfluorocyclohexanone and the like.

Hexafluoropropylene epoxide has been known heretofore. A particularly efficacious method of preparing this material is to treat hexafluoropropylene with hydrogen peroxide in an alkaline reaction medium at a temperature in the range between −50° C. and +50° C., preferably below 0° C. The reaction is preferably accomplished in the presence of a lower molecular weight aliphatic alcohol such as methanol, ethanol or propanol. Higher olefin epoxides, which may also be employed as low temperature, pyrolytic sources of difluorocarbene, may be prepared in a similar fashion by use of the corresponding 1-perfluoroolefin in place of hexafluoropropylene. Tetrafluoroethylene epoxide cannot be prepared in this way, but may be synthesized by the action of molecular oxygen on tetrafluoroethylene at 120° C. in the presence of ultraviolet radiation and a bromine catalyst.

This invention will be better understood by reference to the following examples, which are by no means exhaustive, and are intended to illustrate this invention rather than to delineate its scope.

*Example I*

A platinum tube ½″ in diameter and 7″ long was cleaned by heating to red heat with an oxygen torch and was then sealed at one end. The tube was attached to a manifold, cooled to −80° C. and evacuated. There was then introduced 4.4 g. of hexafluoropropylene oxide. The tube was sealed and placed in a stainless steel high pressure shaker tube. The shaker tube was pressured to 142 atms. with nitrogen and heated to 200° for four hours. Discharge of the platinum tube afforded 5 mg. of a low molecular weight polymer of composition $(CF_2)_n$ together with trifluoroacetyl fluoride and perfluorocyclopropane as the major products as well as trace amounts of tetrafluoroethylene. These products were identified by their infrared spectra.

*Example II*

The process of Example I was repeated except that the platinum tube was charged with 0.5 g. of copper powder and 12 g. of hexafluoropropylene epoxide. The platinum tube was placed inside the shaker tube which was pressured to 4000 atms. with nitrogen and heated to 140° C. for four hours. There was obtained 3.2 g. of poly($CF_2$) which was shown to be highly branched by infrared and X-ray analyses. The only other product obtained was trifluoroacetyl fluoride together with recovered hexafluoropropylene oxide.

*Example III*

A 300 ml. stainless steel shaker tube was cooled to −80° and charged with 82.2 g. of cyclohexene. The tube was closed, evacuated, and charged with 133 g. of heafluoropropylene oxide. It was then heated to 200° at autogenous pressure for three hours. The volatile reaction products were vented from the shaker tube and the mixture of solid and liquid product collected. The solid was filtered from the mixture and washed with ether. The washings were combined with the original filtrate. There was obtained 10 g. of poly($CF_2$), melting point 305°. The liquid product was distilled through a two-foot spinning band column yielding about 25 g. of cyclohexene and 37.2 g. of pure difluoronorcarane, of boiling point 121.5 to 123° C. Elemental analyses were consistent with the assigned structure and infrared spectra showed the product to be identical with authentic difluoronorcarane.

Calculated for $C_7H_{10}F_2$: F, 28.7%; C, 63.7%; H, 7.7%. Found: F, 28.3%; C, 63.3%; H, 7.9%.

*Example IV*

The process of Example III was repeated except that the shaker tube was charged with 98 g. of 1-heptene and 100 g. of hexafluoropropylene oxide. The tube was heated to 175° for three hours. The yellow solution obtained from the shaker tube was filtered to remove a small amount of solid and was distilled through a spining band column. There was obtained, in addition to recovered 1-heptene, 49.5 g. of 1,1-difluoro-2-pentylcyclopropane (56% yield) boiling at 129 to 130°. A second reaction under similar conditions gave an 88% yield of the cyclopropane.

Calculated for $C_8H_{14}F_2$: F, 25.7%; C, 64.7%; H, 9.5%. Found: F, 25.4%; C, 64.6%; H, 9.7%.

*Example V*

The process of Example III was repeated except that the shaker tube was charged with 80 g. of perfluoromethyl perfluorovinyl ether and 83 g. of hexafluoropropylene oxide. The tube was heated to 185° for three hours and the gaseous products were collected in a "Dry Ice" cooled trap. Low temperature distillation gave 80 g. of perfluoromethoxycyclopropane, B.P. −7° to −3°. Infrared and NMR spectra were consistent with the assigned structure.

*Example VI*

Into a 100 ml. stainless steel shaker tube were charged 31 g. of omega-hydroperfluoroheptene-1 and 20 g. of hexafluoropropylene oxide. The tube was heated at 180° for four hours. The liquid product from the reaction was shown to consist of the desired cyclopropane as well as recovered omega-hydroperfluoroheptene-1. Gas chromatographic analysis of the product showed the cyclopropane to have been obtained in 53% conversion. Distillation through a spinning band column yielded 26.6 g. of omega-hydroperfluoropentylcyclopropane of boiling point 130 to 132° C. Infrared and nuclear magnetic resonance spectra were consistent with the assigned structure.

Example VII

The process of Example VI was repeated except that perfluoroheptene-1 was used instead of omega-hydroperfluoroheptene-1. The product, perfluoropentylcyclopropane, boiled at 94° C. Its infrared and nuclear magnetic resonance spectra were consistent with the assigned structure.

Example VIII 21 grams of hexafluoropropylene expoxide and 30 grams of hexafluoroacetone were placed in a clean, platinum tube and the tube closed. The platinum tube was then placed in a pressure vessel, and pressured to 2000 atmospheres with nitrogen, then heated to 150° C. for two hours. The assembly was then cooled, the pressure let down and the contents of the platinum tube were transferred to a distillation apparatus and separated. A product, found to boil at 3° C.±1°, and to melt at −122° C.±1° C., was identified as perfluoroisobutylene epoxide by infrared and nuclear magnetic resonance spectra. The characteristic infrared absorption band for the perfluoroepoxy ring was found to occur at a wavelength of 6.66 microns.

Calculated for $C_4F_8O$: C, 22.2%; F, 70.2%. Found: C, 22.5%; F, 68.7%.

The following expoxides were also prepared, isolated and identified using the above procedures:

perfluoro-2-ethyl-1,2-epoxy butane
perfluoro-2,3-dimethyl-1,2-epoxybutane

Example IX

Into a 330 cc. stainless steel-lined shaker tube was placed 159 grams of sym-dichlorotetrafluoroacetone. The tube was closed, cooled to −60° C. and evacuated and flushed with nitrogen. Into the evacuated tube was then distilled 100 grams of hexafluoropropylene epoxide. The closed tube was then heated to 175° C. for three hours, then cooled to room temperature. The volatile reaction products were bled from the tube and the liquid product collected. Analysis showed this to be predominantly a mixture of 1,1-difluoro-2,2-bis(chlorodifluoromethyl)-1,2-epoxyethane and sym-dichlorotetrafluoroacetone. The mixture was separated by distillation to yield pure dichlorotetrafluoroacetone and 1,1-difluoro-2,2-bis(chlorodifluoromethyl)-1,2-epoxyethane.

1,1-difluoro-2-trichloromethyl-2-trifluoromethyl-1,2-epoxyethane was also prepared by this method.

Example X

A hollow quartz tube 1″ in diameter and 12″ long was packed with quartz chips and placed in a split tube furnace. To the inlet of the tube were attached lines leading to cylinders of tetrafluoroethylene and tetrafluoroethylene oxide. The exit end of the tube was attached to a liquid nitrogen-cooled trap. The tube was heated to 160 to 180° C. and flushed with nitrogen. There was then introduced tetrafluoroethylene and tetrafluoroethylene epoxide at equal flow rates such that the contact time in the hot zone was from 1 to 5 seconds. Low temperature distillation of the products condensed in the liquid nitrogen trap afforded perfluorocyclopropane in 75% yield together with carbonyl fluoride as the only by-product. A small amount of poly($CF_2$) was recovered from the lower end of the pyrolysis tube.

The lower molecular weight fluorocarbon polymer is useful as a lubricant and as an impregnating material for dielectrics, particularly porous dielectrics. The addition products of difluorocarbene to olefins have many of the properties of olefins, and are thus useful as monomers or comonomers for the production of novel fluorine-containing polymers. For example, omega-hydroperfluoropentyl cyclopropane prepared by the method described in detail in Example VI was polymerized by heating to 300° C. for three hours at 500 atmosphere pressure to give a waxy polymer of excellent lubricity having a melting point of 80° C. Many other uses as chemical intermediates will be apparent to those skilled in the art.

A particularly valuable application of the difluorocarbene produced under the mild conditions of the present invention is to produce new steroid compounds by addition to double bonds of known steroids, whereby modified physiological activity is produced.

The epoxides produced by the addition of difluorocarbene to fluorinated and chlorinated ketonic compounds are also very useful as chemical intermediates.

Many other embodiments of this invention will be apparent to those skilled in the art.

I claim:
1. A method for the manufacture of fluorinated cyclopropane compounds which comprises mixing an olefinic compound with a perfluorocarbon epoxide of 2–3 carbon atoms, heating the mixture to a temperature in the range between 100° C. and 300° C., and thereafter recovering a fluorinated cyclopropane compound from the reaction product.

2. A method for the production of fluorinated cyclopropane compounds which comprises heating to a temperature in the range between 100 and 300° C. a mixture of a perfluorocarbon epoxide of 2–3 carbon atoms with an olefinic hydrocarbon, and thereafter recovering a reaction product formed by the addition of $-CF_2$ across the double bond to form a three-membered ring.

3. The method as recited in claim 2 wherein said perfluorocarbon epoxide is hexafluoropropylene epoxide.

References Cited

UNITED STATES PATENTS

| | | | |
|---|---|---|---|
| 2,654,789 | 10/1953 | Ligett | 260—648 |
| 2,802,876 | 8/1957 | Broich et al. | 260—593 |
| 2,813,125 | 11/1957 | Christensen et al. | 260—593 |
| 2,848,504 | 8/1958 | Dixon | 260—648 |
| 2,882,279 | 4/1959 | Luvisi et al. | 260—348 |
| 2,907,774 | 10/1959 | MacPeek | 260—348 |
| 3,136,744 | 6/1964 | McGrew | 260—348 X |

FOREIGN PATENTS 904,877  9/1962  Great Britain.

OTHER REFERENCES

Doering et al., Journal of American Chemical Society 76, pp. 6162–65 (1954).

LEON ZITVER, *Primary Examiner.*

NICHOLAS S. RIZZO, *Examiner.*

H. T. MARS, J. P. FRIEDENSON, K. H. JOHNSON, K. V. ROCKEY, M. M. JACOB, *Assistant Examiners.*